United States Patent
Seo et al.

(10) Patent No.: US 11,522,246 B2
(45) Date of Patent: Dec. 6, 2022

(54) BATTERY MODULE, BATTERY PACK INCLUDING SAME BATTERY MODULE, AND AUTOMOBILE INCLUDING SAME BATTERY PACK

(71) Applicant: LG Chem, Ltd., Seoul (KR)

(72) Inventors: Sung-Won Seo, Daejeon (KR); Dong-Yeon Kim, Daejeon (KR); Ho-June Chi, Daejeon (KR); Dal-Mo Kang, Daejeon (KR); Jin-Hak Kong, Daejeon (KR); Jeong-O Mun, Daejeon (KR); Yoon-Koo Lee, Daejeon (KR); Yong-Seok Choi, Daejeon (KR); Alexander Eichhorn, Bietigheim-Bissingen (DE); Andreas Track, Bietigheim-Bissingen (DE)

(73) Assignee: LG Energy Solution, Ltd.

( * ) Notice: Subject to any disclaimer, the term of this patent is extended or adjusted under 35 U.S.C. 154(b) by 233 days.

(21) Appl. No.: 16/629,793

(22) PCT Filed: Feb. 13, 2019

(86) PCT No.: PCT/KR2019/001782
§ 371 (c)(1),
(2) Date: Jan. 9, 2020

(87) PCT Pub. No.: WO2019/172545
PCT Pub. Date: Sep. 12, 2019

(65) Prior Publication Data
US 2021/0036277 A1    Feb. 4, 2021

(30) Foreign Application Priority Data

Mar. 7, 2018 (KR) .................. 10-2018-0026988

(51) Int. Cl.
*H01M 50/20* (2021.01)
*H01M 50/502* (2021.01)
(Continued)

(52) U.S. Cl.
CPC ....... *H01M 50/20* (2021.01); *H01M 10/0481* (2013.01); *H01M 10/482* (2013.01); *H01M 50/502* (2021.01); *H01M 2220/20* (2013.01)

(58) Field of Classification Search
CPC ... H01M 50/502–569; H01M 10/0481; H01M 2220/20; H01M 10/482;
(Continued)

(56) References Cited

U.S. PATENT DOCUMENTS

2008/0113262 A1*  5/2008  Phillips ............... H01M 10/425
                                                                429/149
2011/0059342 A1   3/2011  Lee et al.
(Continued)

FOREIGN PATENT DOCUMENTS

CN    206250254 U    6/2017
EP    3651231 A1     5/2020
(Continued)

OTHER PUBLICATIONS

Machine Translation of KR 20140130357 A (Year: 2014).*
(Continued)

*Primary Examiner* — Matthew T Martin
*Assistant Examiner* — Unique Jenevieve Luna
(74) *Attorney, Agent, or Firm* — Lerner, David, Littenberg, Krumholz & Mentlik, LLP (57) ABSTRACT

A battery module includes: a battery cell assembly having a plurality of battery cells; a top plate configured to cover an upper side of the battery cell assembly; a bottom plate configured to cover a lower side of the battery cell assembly; a sensing assembly disposed to cover a front side and a rear
(Continued)

side of the battery cell assembly; a pair of side plates disposed at side surfaces, respectively, of the battery cell assembly; and a pair of compression pads disposed between the pair of side plates and the battery cell assembly, respectively.

11 Claims, 5 Drawing Sheets

(51) Int. Cl.
*H01M 10/04* (2006.01)
*H01M 10/48* (2006.01)

(58) Field of Classification Search
CPC ..... H01M 10/0468; H01M 50/20–298; H01M 50/50–569
See application file for complete search history.

(56) References Cited

U.S. PATENT DOCUMENTS

| | | |
|---|---|---|
| 2011/0293978 A1 | 12/2011 | Kim |
| 2013/0115496 A1 | 5/2013 | Mack |
| 2015/0064541 A1 | 3/2015 | Noh et al. |
| 2015/0380697 A1* | 12/2015 | Osborne ............ H01M 50/209 429/153 |
| 2016/0308186 A1 | 10/2016 | Han |
| 2017/0033332 A1 | 2/2017 | Sakai et al. |
| 2017/0141365 A1 | 5/2017 | Kim et al. |
| 2017/0190264 A1 | 7/2017 | Kim et al. |
| 2017/0194771 A1 | 7/2017 | Aoki |
| 2017/0352857 A1 | 12/2017 | Kuboki et al. |
| 2018/0048033 A1 | 2/2018 | Lee et al. |
| 2018/0062127 A1 | 3/2018 | Lee et al. |
| 2018/0151855 A1 | 5/2018 | Iwasaki et al. |
| 2018/0175343 A1 | 6/2018 | Choi et al. |
| 2018/0183033 A1 | 6/2018 | You |

FOREIGN PATENT DOCUMENTS

| | | | |
|---|---|---|---|
| JP | 2011253799 A | 12/2011 | |
| JP | 2012523083 A | 9/2012 | |
| JP | 2013178894 A | 9/2013 | |
| JP | 2015207442 A | 11/2015 | |
| JP | 2016119240 A | 6/2016 | |
| JP | 2017195018 A | 10/2017 | |
| KR | 20140130357 A * | 11/2014 | |
| KR | 20150024724 A | 3/2015 | |
| KR | 20160123814 A | 10/2016 | |
| KR | 20160149836 A | 12/2016 | |
| KR | 20170050508 A | 5/2017 | |
| KR | 20170050509 A | 5/2017 | |
| KR | 20170056976 A | 5/2017 | |
| KR | 20170135597 A | 12/2017 | |
| KR | 101829350 B1 | 2/2018 | |
| WO | WO-2008021964 A2 * | 2/2008 | .......... H01M 10/425 |
| WO | 2016204470 A1 | 12/2016 | |
| WO | 2017026145 A1 | 2/2017 | |

OTHER PUBLICATIONS

Machine Translation of KR 20160149836 A (Year: 2016).*
European Search Report for Patent Application No. 19763310.0, dated Dec. 11, 2020, 8 pages.
International Search Report for PCT/KR2019/001782 dated May 17, 2019.

* cited by examiner

BATTERY MODULE, BATTERY PACK INCLUDING SAME BATTERY MODULE, AND AUTOMOBILE INCLUDING SAME BATTERY PACK

CROSS-REFERENCE TO RELATED APPLICATIONS

The present application is a national phase entry under 35 U.S.C. § 371 of International Application No. PCT/KR2019/001782, filed Feb. 13, 2019, which claims priority to Korean Patent Application No. 10-2018-0026988 filed on Mar. 7, 2018 in the Republic of Korea, the disclosures of which are incorporated herein by reference.

TECHNICAL FIELD

The present disclosure relates to a battery module, a battery pack including the battery module, and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

In recent years, the demand for battery modules and battery packs that may realize a high energy density while maintaining a more compact size in accordance with the slimming trend has been gradually increasing.

Accordingly, it is required to find a way to realize a more compact size while further securing a greater space for the battery cells provided in the battery module or the battery pack.

DISCLOSURE

Technical Problem

The present disclosure is directed to providing a battery module, which may realize a more compact size while further securing a greater space for battery cells, a battery pack including the battery module, and a vehicle including the battery pack.

Technical Solution

In one aspect of the present disclosure, there is provided a battery module, comprising: a battery cell assembly having a plurality of battery cells; a top plate configured to cover an upper side of the battery cell assembly; a bottom plate disposed opposite to the top plate and configured to cover a lower side of the battery cell assembly; a sensing assembly disposed at a front side and a rear side of the bottom plate and at a front side and a rear side of the top plate to cover a front side and a rear side of the battery cell assembly; a pair of side plates coupled to the sensing assembly, the top plate and the bottom plate and disposed at side surfaces, respectively, of the battery cell assembly; and a pair of compression pads disposed between the pair of side plates and the battery cell assembly, respectively.

The sensing assembly may include: a first bus bar unit disposed at the front side of the battery cell assembly and coupled to the pair of side plates; a second bus bar unit disposed opposite to the first bus bar unit and coupled to the pair of side plates at the rear side of the battery cell assembly; and a pair of sensing wires configured to connect the first bus bar unit and the second bus bar unit, each of the pair of sensing wires being interposed at one of the side surfaces of the battery cell assembly between the respective one of the pair of compression pads and the respective one of the pair of side plates.

Each of the pair of sensing wires may be provided as a flexible printed circuit board.

The pair of compression pads may each have a wire placing groove formed along a longitudinal direction thereof so that the pair of sensing wires are placed therein, respectively.

Each wire placing groove may have a depth corresponding to a thickness of one of the pair of sensing wires.

The pair of side plates may each have a wire placing groove formed along a longitudinal direction thereof so that the pair of sensing wires are placed therein, respectively.

Each wire placing groove may have a depth corresponding to a thickness of one of the pair of sensing wires.

The first bus bar unit and the second bus bar unit may be coupled to the pair of side plates by at least one coupling pin.

The at least one coupling pin may include a plurality of coupling pins, and the plurality of coupling pins may be provided at opposing ends of the first bus bar unit and at opposing ends of the second bus bar unit and may be spaced apart from each other by a predetermined distance along a height direction of the first bus bar unit and the second bus bar unit.

The pair of side plates may have at least one pin insert groove into which the at least one coupling pin is inserted, respectively.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may realize a more compact size while further securing a greater space for battery cells, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
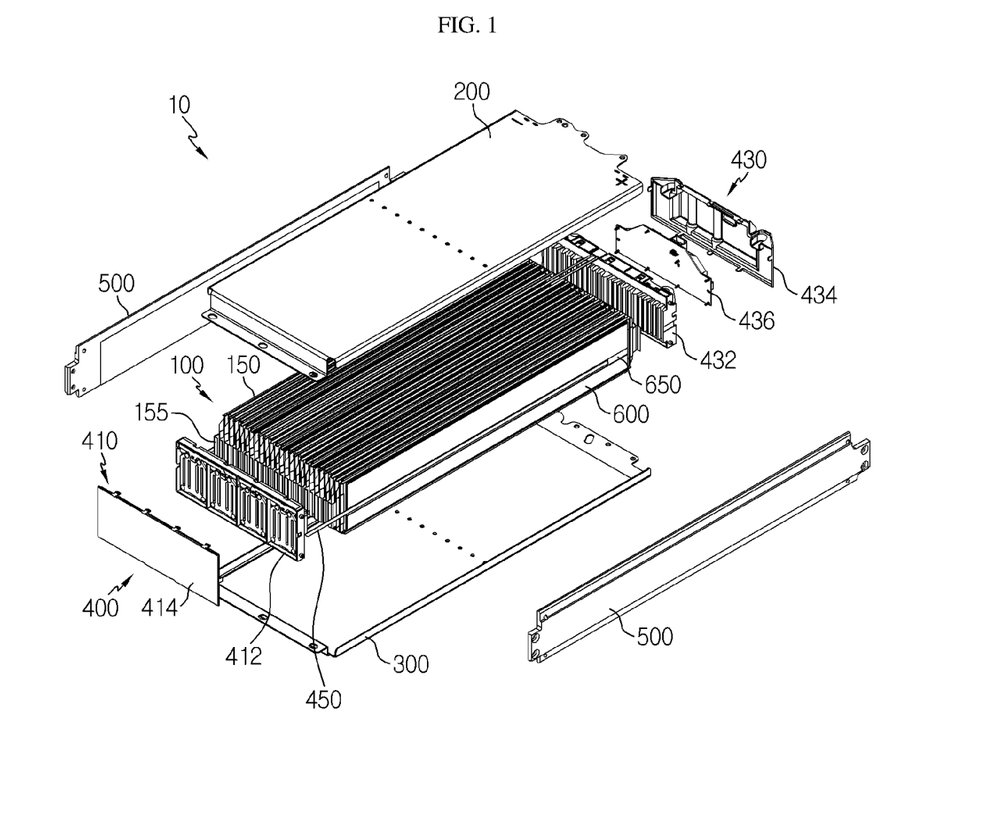
FIG. 1 is a diagram for illustrating a battery module according to an embodiment of the present disclosure.
Figure 2:
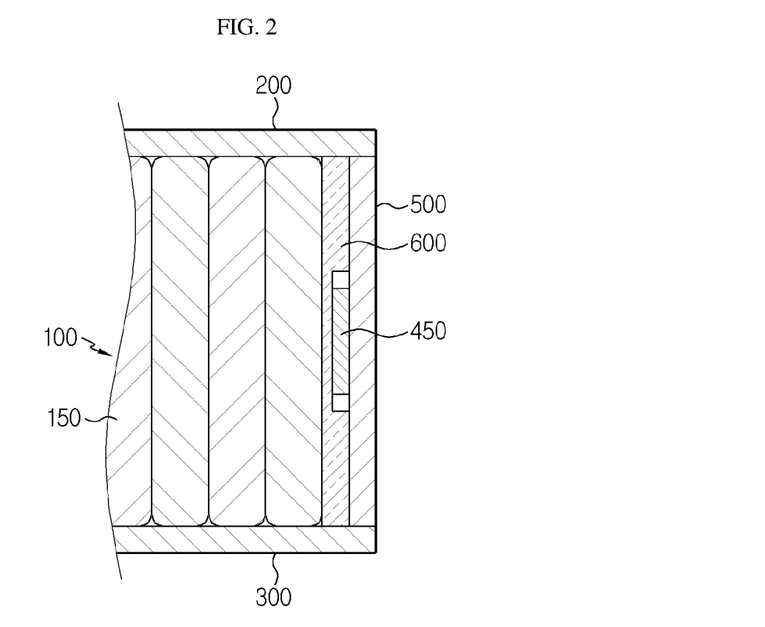
FIG. 2 is a side sectional view showing the battery module of FIG. 1.
Figure 3:
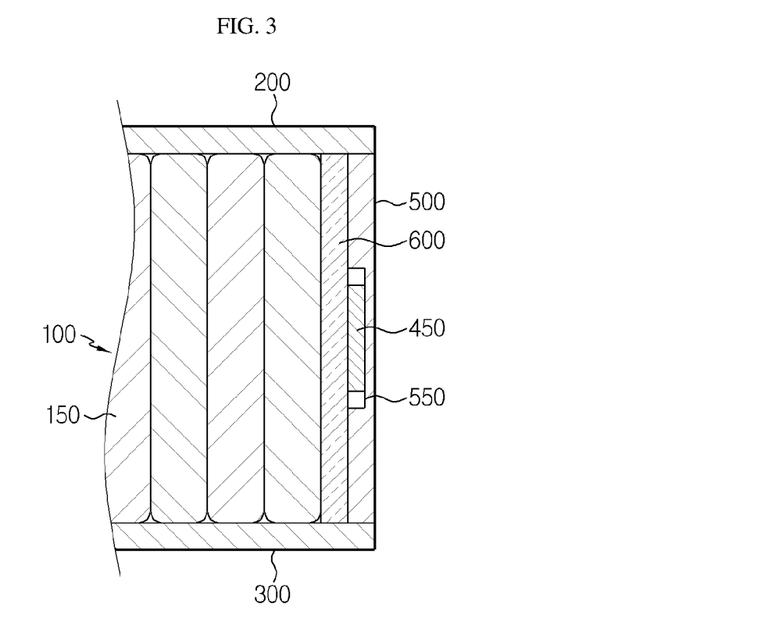
FIG. 3 is a side sectional view showing the battery module of FIG. 1 according to another embodiment.

FIG. 1 is a diagram for illustrating a battery module according to an embodiment of the present disclosure, FIG. 2 is a side sectional view showing the battery module of FIG. 1, and FIG. 3 is a side sectional view showing the battery module of FIG. 1 according to another embodiment.

Referring to FIGS. 1 to 3, the battery module 10 may include a battery cell assembly 100, a top plate 200, a bottom plate 300, a sensing assembly 400, a side plate 500, and a compression pad 600.

The battery cell assembly 100 may include a plurality of battery cells 150. The plurality of battery cells 150 may be stacked so as to be electrically connected to each other. Here, electrode leads 155 of the plurality of battery cells 150 may be electrically connected to the sensing assembly 400, explained later.

The top plate 200 may cover an upper side of the battery cell assembly 100. To this end, the top plate 200 may have a size and shape to cover the entire upper side of the battery cell assembly 100.

The bottom plate 300 is disposed opposite to the top plate 200 and may cover a lower side of the battery cell assembly 100. The bottom plate 300 may stably support the battery cell assembly 100.

The sensing assembly 400 is disposed at a front side and a rear side of the top plate 200 and the bottom plate 300 and may cover the front and rear of the battery cell assembly 100.

The sensing assembly 400 is electrically connected to the battery cell assembly 100 and may sense a voltage or temperature of the battery cell assembly 100. In addition, the sensing assembly 400 may be connected to an external power source or the like.

The sensing assembly 400 may include a first bus bar unit 410, a second bus bar unit 430, and a sensing wire 450.

The first bus bar unit 410 is disposed at a front side of the battery cell assembly 100 and may be coupled to a pair of side plates 500, explained later. Here, the first bus bar unit 410 may also be coupled to the top plate 200 and the bottom plate 300 together.

The first bus bar unit 410 may include a bus bar body 412 and a cover frame 414.

The bus bar body 412 may be electrically connected to the electrode leads 155 of the battery cells 150 of the battery cell assembly 100. To this end, the bus bar body 412 may have a plurality of bus bars electrically contacted and connected to the electrode leads 155 of the battery cells 155.

The cover frame 414 may cover the front side of the bus bar body 412. The cover frame 414 may form a front surface of the battery module 10.

The second bus bar unit 430 is disposed to face the first bus bar unit 410 with the battery cell assembly 100 being interposed therebetween and may be coupled to a pair of side plates 500, explained later, at a rear side of the battery cell assembly 100. Here, the second bus bar unit 430 may also be coupled to the top plate 200 and the bottom plate 300 together.

The second bus bar unit 430 may include a bus bar body 432, a cover frame 434, and a control board 436.

The bus bar body 432 may be electrically connected to the electrode leads 155 of the battery cells 150 of the battery cell assembly 100. To this end, the bus bar body 432 may have a plurality of bus bars electrically contacted and connected to the electrode leads 155 of the battery cells 155.

The cover frame 434 may cover the rear side of the bus bar body 432. The cover frame 434 may form a rear surface of the battery module 10.

The control board 436 is for controlling the operation of the sensing assembly 400 and may be mounted between the bus bar body 432 and the cover frame 434. The control board 436 may be a printed circuit board.

The sensing wire 450 may connect the first bus bar unit 410 and the second bus bar unit 430. The sensing wire 450 may be formed as a flexible printed circuit board and may be provided in a pair.

The pair of sensing wires 450 may be fitted into the pair of side plates 500, explained later, or into the pair of compression pads 600, explained later. That is, in this embodiment, the pair of sensing wires 450 may be provided at both side surfaces of the battery module 10.

The side plate 500 is coupled to the top plate 200 and the bottom plate 300 and may be disposed at both side surfaces of the battery cell assembly 100. To this end, the side plate 500 may be provided in a pair.

The compression pad 600 may be disposed between the pair of side plates 500 and the battery cell assembly 100. The compression pad 600 may be provided only in a pair.

One of the pair of compression pads 600 may be disposed at one of the pair of side plates 500 and one side surface of the battery cell assembly 100.

The other of the pair of compression pads 600 may be disposed at the other of the pair of side plates 500 and the other side surface of the battery cell assembly 100.

As described above, in this embodiment, since the compression pads 600 are provided only in a pair, the space efficiency of the battery module 10 may be maximized compared with a conventional structure in which a plurality of compression pads are mounted, and the battery module 10 may be designed in a slim form more easily.

The pair of compression pads 600 may each have a wire placing groove 650.

Each wire placing groove 650 may be formed by a predetermined length along the longitudinal direction of each of the pair of compression pads 600, respectively, and the pair of sensing wires 450 may be placed therein, respectively.

Each wire placing groove 650 may have a depth corresponding to the thickness of one of the pair of sensing wires 450. Accordingly, the pair of sensing wires 450 may not protrude out of the compression pads 600 when being placed in the wire placing grooves 650.

Meanwhile, the wire placing groove 550 may also be formed at each of the pair of side plates 500 as disclosed in FIG. 3, instead of at each of the pair of compression pads 600. That is, the pair of side plates 500 may each have a wire placing groove 550 formed along the longitudinal direction thereof by a predetermined length so that the pair of sensing wires 450 is placed therein, respectively. Also, the depth of each wire placing groove 550 may be correspond to the thickness of one of the pair of sensing wires 450.

As described above, in this embodiment, since the pair of sensing wires 450 are provided at both side surfaces of the battery module 10, the space efficiency of the battery module 10 may be improved in the height direction.

Also, in this embodiment, since the pair of sensing wires 450 are mounted to both side surfaces of the battery module 10 not to protrude out of the side plate 500 or the compression pad 600, it is possible to secure space efficiency of both side surfaces of the battery module 10.

Figure 4:
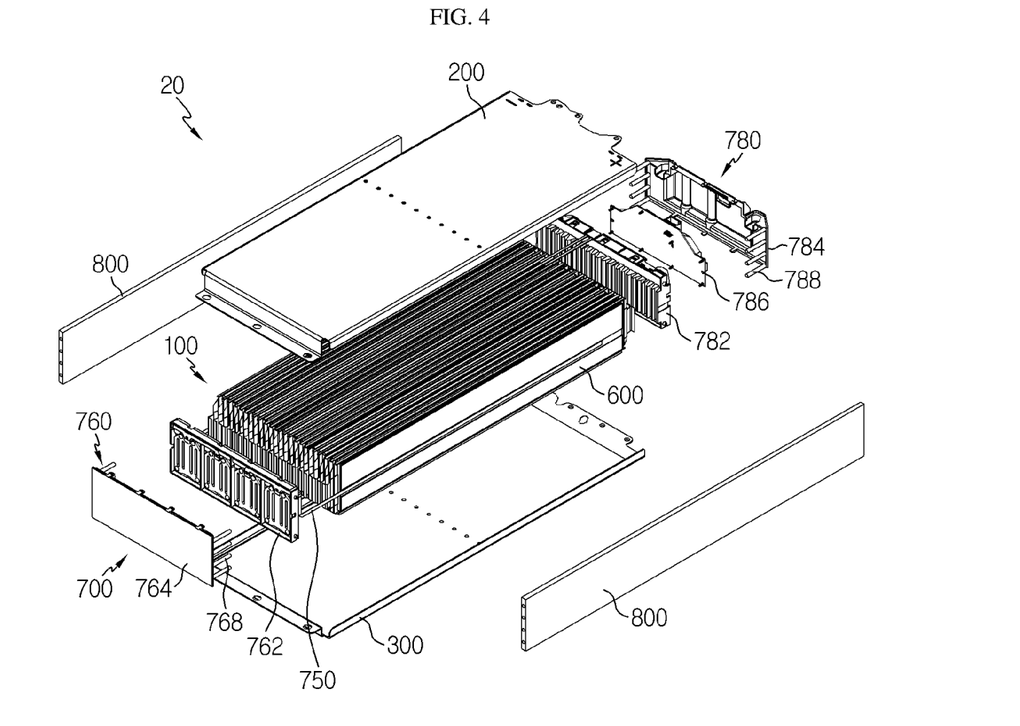
FIG. 4 is a diagram for illustrating a battery module according to another embodiment of the present disclosure.
Figure 5:
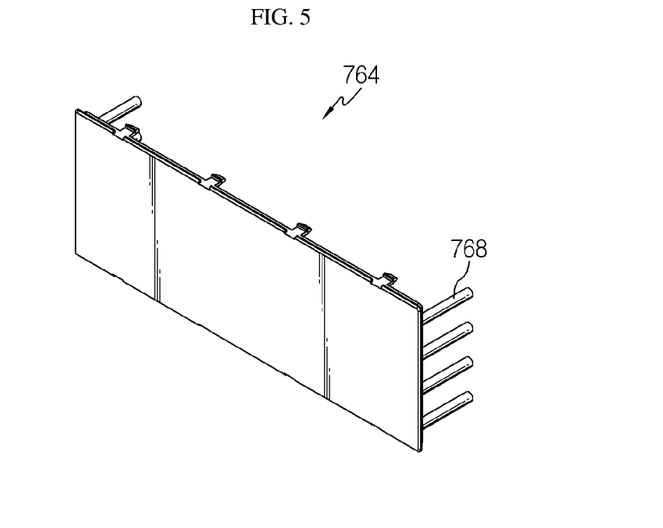
FIG. 5 is a diagram for illustrating a main part of a sensing assembly of the battery module of FIG. 4.
Figure 6:
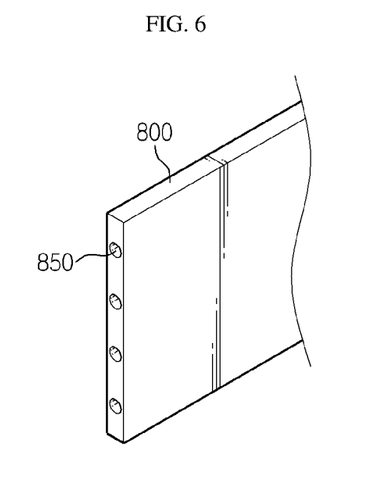
FIG. 6 is a diagram for illustrating a main part of a side plate of the battery module of FIG. 4.

FIG. 4 is a diagram for illustrating a battery module according to another embodiment of the present disclosure, FIG. 5 is a diagram for illustrating a main part of a sensing assembly of the battery module of FIG. 4, and FIG. 6 is a diagram for illustrating a main part of a side plate of the battery module of FIG. 4.

Since the battery module 20 of this embodiment is substantially identical or similar to the battery module 10 of the former embodiment, the identical or similar features will not be explained again, and the following description will focus on different features from the former embodiment.

Referring to FIGS. 4 to 6, the battery module 20 may include a battery cell assembly 100, a top plate 200, a bottom plate 300, a pair of compression pads 600, a sensing assembly 700, and a pair of side plates 800.

The battery cell assembly 100, the top plate 200, the bottom plate 300 and the pair of compression pads 600 are substantially identical or similar to those of the former embodiment and thus will not described again.

The sensing assembly 700 may include a sensing wire 750, a first bus bar unit 760 and a second bus bar unit 780.

The sensing wire 750 is substantially identical or similar to that of the former embodiment and thus will not described again.

The first bus bar unit 760 may include a bus bar body 762, a cover frame 764, and a coupling pin 768.

The bus bar body 762 and the cover frame 764 are substantially identical or similar to those of the former embodiment and thus will not described again.

The coupling pin 768 may couple the first bus bar unit 760 and the pair of side plates 800, explained later, to each other. The coupling pin 768 may be provided in plural.

The plurality of coupling pins 768 are provided at both ends of the first bus bar unit 760 and may be spaced apart from each other by a predetermined distance along the height direction of the first bus bar unit 760.

Specifically, the plurality of coupling pins 768 are provided at both side surfaces of the cover frame 764 and may be spaced apart from each other along the height direction of the cover frame 764.

The second bus bar unit 780 may include a bus bar body 782, a cover frame 784, a control board 786, and a coupling pin 788.

The bus bar body 782, the cover frame 784 and the control board 786 are substantially identical or similar to those of the former embodiment and thus will not described again.

The coupling pin 788 may couple the second bus bar unit 780 with the pair of side plates 800, explained later, to each other. The coupling pin 788 may be provided in plural.

The plurality of coupling pins 788 are provided at both ends of the second bus bar unit 780 and may be spaced apart from each other by a predetermined distance along the height direction of the second bus bar unit 780.

Specifically, the plurality of coupling pins 788 are provided at both side surfaces of the cover frame 784 and may be spaced apart from each other along the height direction of the cover frame 784.

The pair of side plates 800 may have a pin insert groove 850 formed therein.

The coupling pins 768 of the first bus bar unit 760 and the coupling pins 788 of the second bus bar unit 780 may be inserted into the pin insert groove 850.

The pin insert groove 850 may be provided in plural. The plurality of pin insert grooves 850 may be spaced apart from each other by a predetermined distance along the height direction of the pair of side plates 800.

In this embodiment, the sensing assembly 700 and the side plate 800 may be coupled more conveniently by means of the pin insertion structure of the sensing assembly 700 and the side plate 800 without any additional bonding process such as welding.

Figure 7:
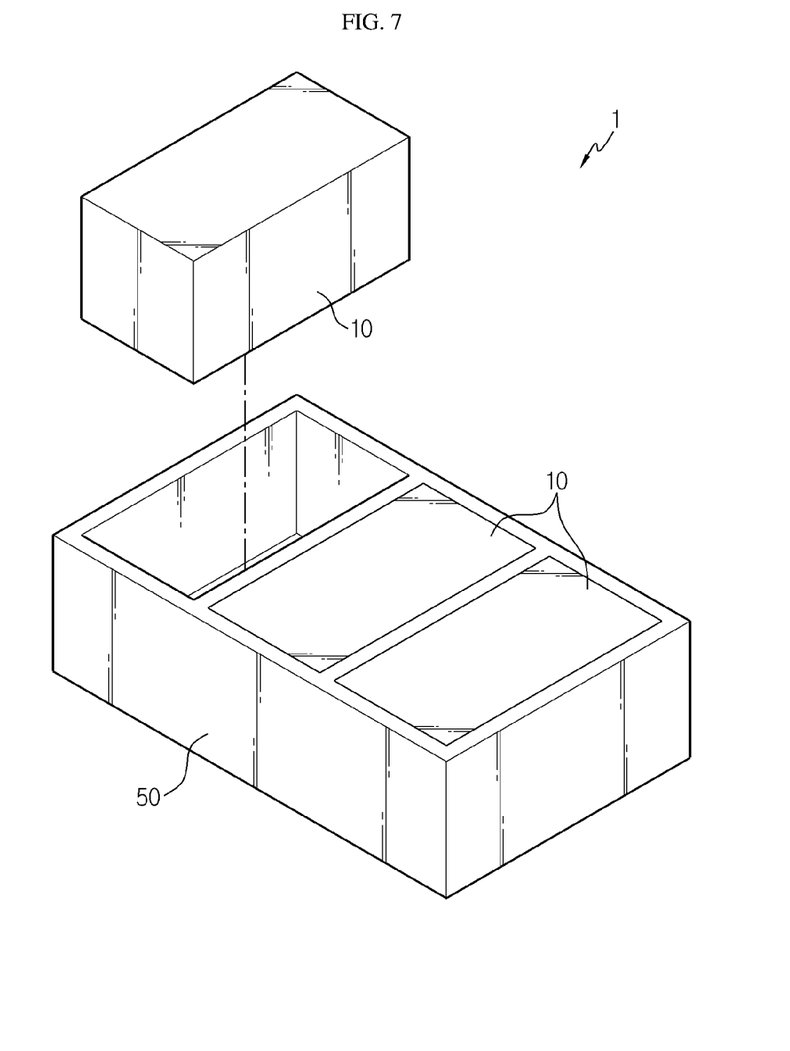
FIG. 7 is a diagram for illustrating a battery pack according to an embodiment of the present disclosure.

FIG. 7 is a diagram for illustrating a battery pack according to an embodiment of the present disclosure.

Referring to FIG. 7, a battery pack 1 may include at least one battery module 10 according to the former embodiment and a pack case 50 for packaging the at least one battery module 10.

Here, the at least one battery module may be the battery module 20 of the former embodiment. It is also possible that the battery module may be provided as a group of the battery module 10 and the battery module 20 of the former embodiments.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

According to various embodiments as above, it is possible to provide a battery module 10, 20, which may realize a more compact size while further securing a greater space for battery cells 150, a battery pack 1 including the battery module 10, 20, and a vehicle including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a battery cell assembly having a plurality of battery cells;
   a top plate configured to cover an upper side of the battery cell assembly;
   a bottom plate disposed opposite to the top plate and configured to cover a lower side of the battery cell assembly;
   a sensing assembly disposed at a front side and a rear side of the bottom plate and at a front side and a rear side of the top plate to cover a front side and a rear side of the battery cell assembly;
   a pair of side plates coupled to the sensing assembly, the top plate and the bottom plate and disposed at side surfaces, respectively, of the battery cell assembly; and
   a pair of compression pads disposed between the pair of side plates and the battery cell assembly, respectively,
   wherein the sensing assembly includes:
   a first bus bar unit disposed at the front side of the battery cell assembly and coupled to the pair of side plates;
   a second bus bar unit disposed opposite to the first bus bar unit and coupled to the pair of side plates at the rear side of the battery cell assembly; and
   a pair of sensing wires configured to connect the first bus bar unit and the second bus bar unit, each of the pair of sensing wires fitted into the respective one of the pair of compression pads at one of the side surfaces of the battery cell assembly.

2. The battery module according to claim 1,
   wherein each one of the pair of sensing wires is provided as a flexible printed circuit board.

3. The battery module according to claim 1,
   wherein the pair of compression pads each has a wire placing groove formed along a longitudinal direction thereof so that the pair of sensing wires are placed therein, respectively.

4. The battery module according to claim 3,
   wherein each wire placing groove has a depth corresponding to a thickness of one of the pair of sensing wires.

5. The battery module according to claim 1,
   wherein the pair of side plates each has a wire placing groove formed along a longitudinal direction thereof so that the pair of sensing wires are placed therein, respectively.

6. The battery module according to claim 5,
   wherein each wire placing groove has a depth corresponding to a thickness of one of the pair of sensing wires.

7. The battery module according to claim 1,
   wherein the first bus bar unit and the second bus bar unit are coupled to the pair of side plates by at least one coupling pin.

8. The battery module according to claim 7,
   wherein the at least one coupling pin includes a plurality of coupling pins, and
   wherein the plurality of coupling pins are provided at opposing ends of the first bus bar unit and at opposing ends of the second bus bar unit and are spaced apart from each other by a predetermined distance along a height direction of the first bus bar unit and the second bus bar unit.

9. The battery module according to claim 7,
   wherein the pair of side plates have at least one pin insert groove into which the at least one coupling pin is inserted, respectively.

10. A battery pack, comprising:
    at least one battery module according to claim 1; and
    a pack case configured to package the at least one battery module.

11. A vehicle, comprising:
    at least one battery pack according to claim 10.

* * * * *